United States Patent
Wang et al.

(10) Patent No.: US 8,424,383 B2
(45) Date of Patent: Apr. 23, 2013

(54) MASS FOR USE IN A MICRO-ELECTRO-MECHANICAL-SYSTEM SENSOR AND 3-DIMENSIONAL MICRO-ELECTRO-MECHANICAL-SYSTEM SENSOR USING SAME

(75) Inventors: Chuan-Wei Wang, Hsin-Chu (TW); Sheng-Ta Lee, Hsin-Chu (TW)

(73) Assignee: Pixart Imaging Incorporation, Hsin-Chu (TW)

( * ) Notice: Subject to any disclaimer, the term of this patent is extended or adjusted under 35 U.S.C. 154(b) by 560 days.

(21) Appl. No.: 12/652,108

(22) Filed: Jan. 5, 2010

(65) Prior Publication Data
US 2011/0162453 A1 Jul. 7, 2011

(51) Int. Cl.
*G01P 15/125* (2006.01)

(52) U.S. Cl.
USPC ..................... 73/514.32; 73/514.38

(58) Field of Classification Search ............... 73/514.32, 73/514.38
See application file for complete search history.

(56) References Cited

U.S. PATENT DOCUMENTS

| | | | |
|---|---|---|---|
| 5,326,726 A | 7/1994 | Tsang et al. | |
| 5,847,280 A | 12/1998 | Sherman et al. | |
| 5,880,369 A | 3/1999 | Samuels et al. | |
| 6,402,968 B1 | 6/2002 | Yazdi et al. | |
| 6,792,804 B2 | 9/2004 | Adams et al. | |
| 6,845,670 B1 | 1/2005 | McNeil et al. | |
| 6,877,374 B2 | 4/2005 | Geen et al. | |
| 6,892,576 B2 | 5/2005 | Samuels et al. | |
| 7,138,694 B2 | 11/2006 | Nunan et al. | |
| 7,258,011 B2 | 8/2007 | Nasiri et al. | |
| 7,268,463 B2 * | 9/2007 | Li et al. ................. 73/514.32 | |

FOREIGN PATENT DOCUMENTS

| | | |
|---|---|---|
| CN | 1598597 A | 3/2005 |
| WO | WO 2005017536 A1 | 2/2005 |

* cited by examiner

*Primary Examiner* — John Chapman, Jr.
(74) *Attorney, Agent, or Firm* — Tung & Associates

(57) ABSTRACT

A 3-dimensional MEMS sensor, comprising: a first axis fixed electrode; a second axis fixed electrode; a third axis fixed electrode; a movable electrode frame including a first axis movable electrode, a second axis movable electrode, a third axis movable electrode, and a connection part connecting the movable electrodes, wherein the first axis movable electrode and the first axis fixed electrode form a first capacitor along the first axis, the second axis movable electrode and the second axis fixed electrode form a second capacitor along the second axis, and the third axis movable electrode and the third axis fixed electrode form a third capacitor along the third axis, the connection part including a center mass, wherein the center mass is at least connected with one of the first, second and third axis movable electrodes, and has an outer periphery and a first interconnecting segment connecting at least two adjacent sides of the outer periphery; at least one spring connecting with the movable electrode frame; and at least one anchor connecting with the spring, wherein the first, second and third axes are not parallel to one another such that they define a 3-dimensional coordinate system.

20 Claims, 8 Drawing Sheets

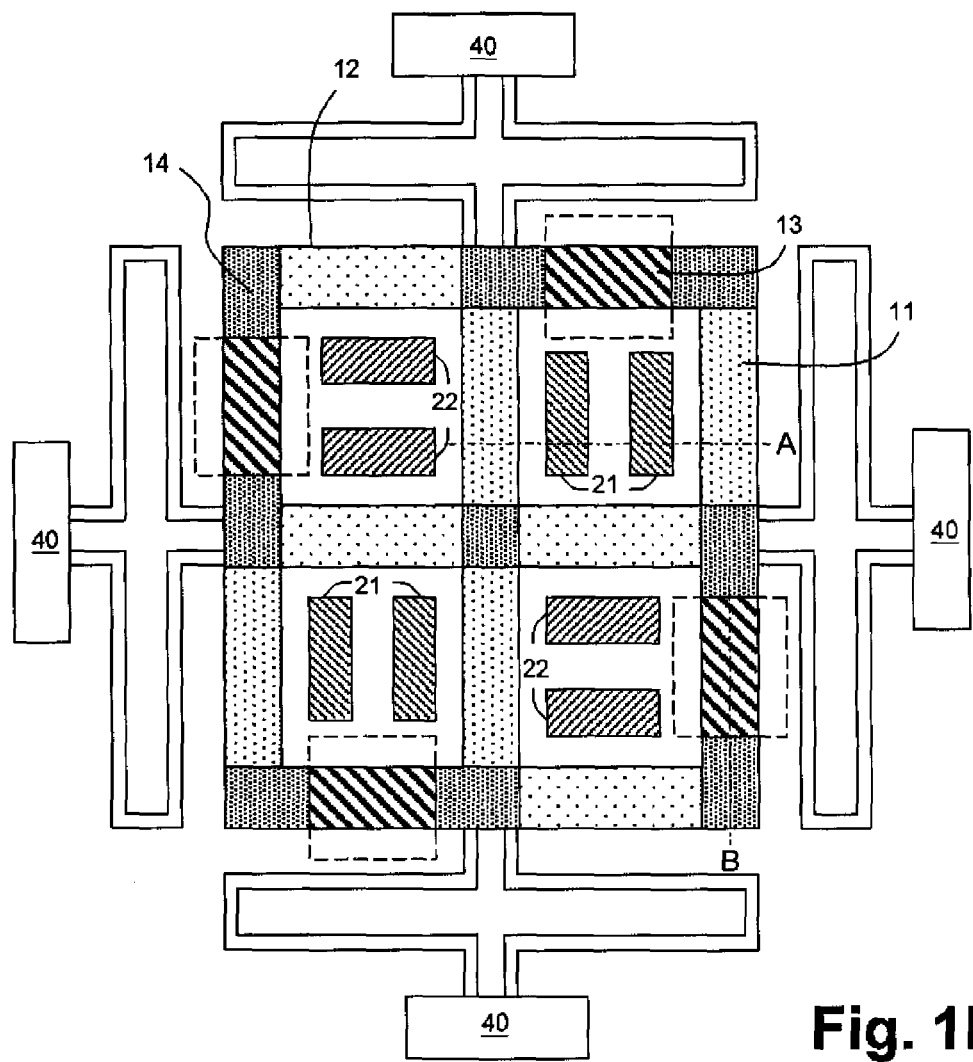
Fig. 1B
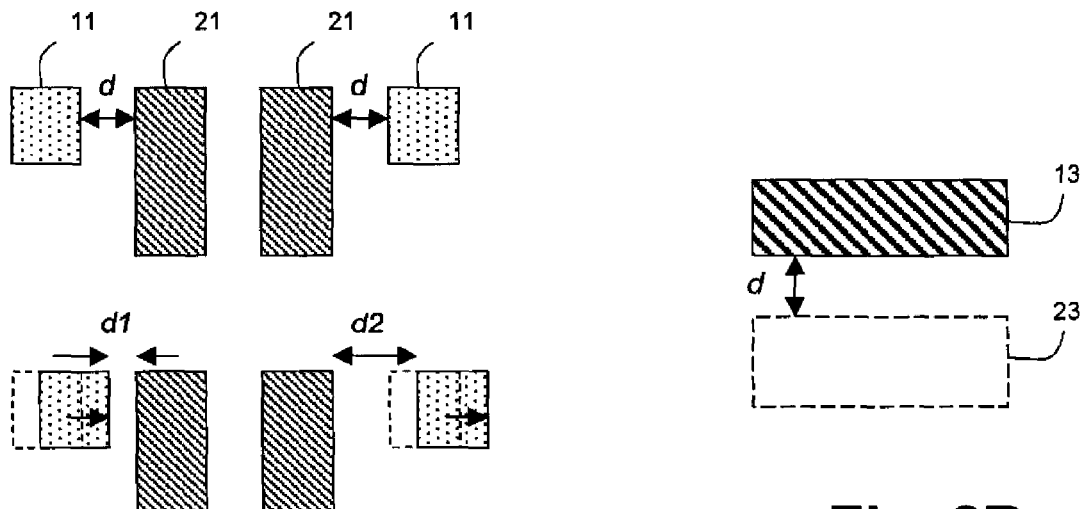
Fig. 2A
Fig. 2B

← This side preferably closer to the center of frame 10

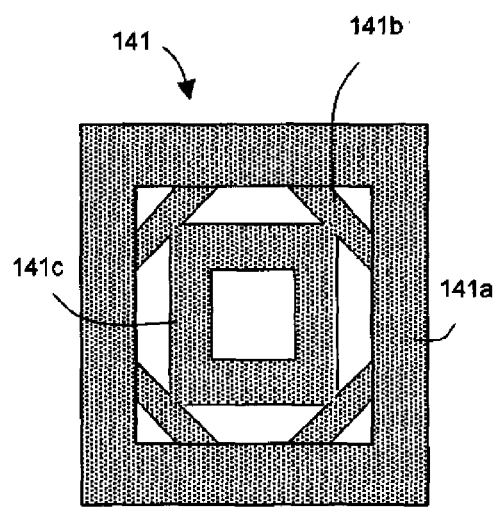
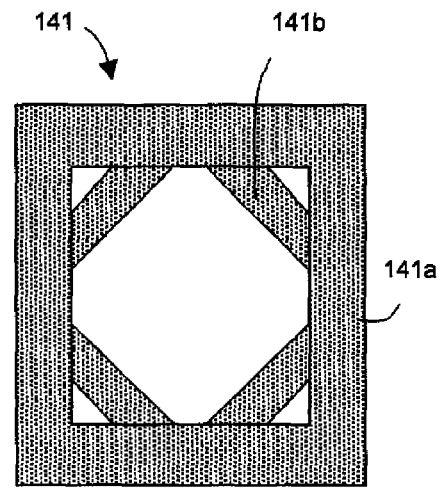
Fig. 7A  Fig. 7B
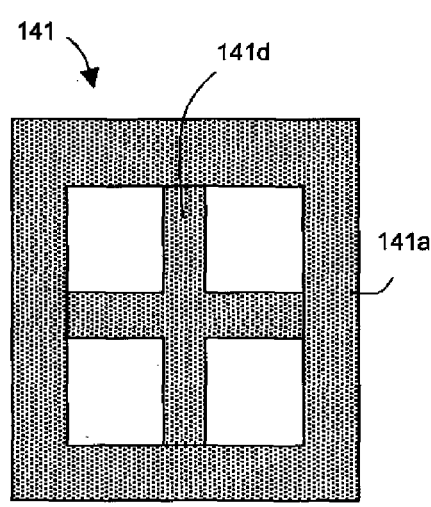
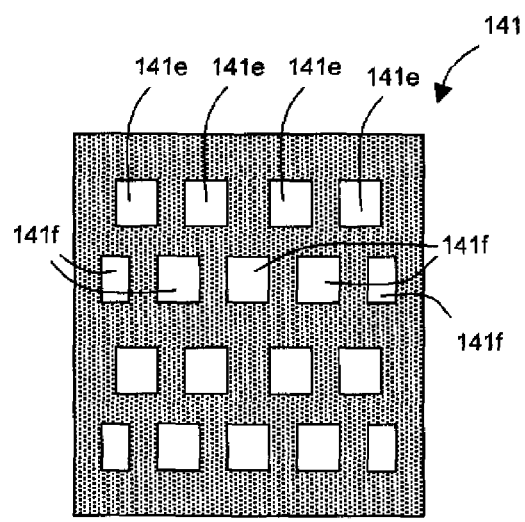
Fig. 7C  Fig. 7D
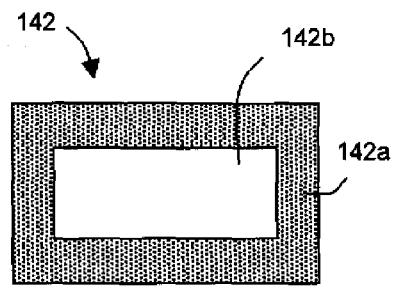
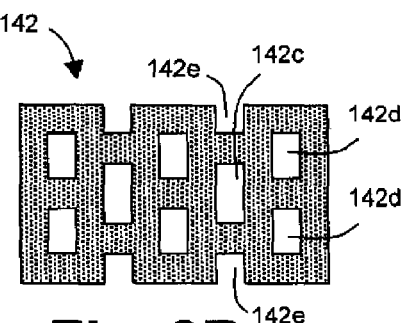
Fig. 8A  Fig. 8B

MASS FOR USE IN A MICRO-ELECTRO-MECHANICAL-SYSTEM SENSOR AND 3-DIMENSIONAL MICRO-ELECTRO-MECHANICAL-SYSTEM SENSOR USING SAME

BACKGROUND OF THE INVENTION

1. Field of Invention

The present invention relates to a mass for use in a micro-electro-mechanical-system (MEMS) sensor, and a 3-dimensional MEMS sensor using the mass.

2. Description of Related Art

MEMS devices are used in a wide variety of products, of which one application is capacitance-type sensors, such as accelerometer, microphone, etc. There are two types of such sensors, i.e., in-plane sensors and out-of-plane sensors, wherein the former is used to sense a capacitance variation in a horizontal direction (x-y plane), and the latter is used to sense the capacitance variation in a vertical direction (z axis). With respect to in-plane sensors and methods for making such sensors, prior art U.S. Pat. Nos. 5,326,726; 5,847,280; 5,880,369; 6,877,374; 6,892,576; and U.S. publication No. 2007/0180912 disclose several examples. With respect to out-of-plane sensors and methods for making such sensors, prior art U.S. Pat. Nos. 6,402,968; 6,792,804; 6,845,670; 7,138,694; and 7,258,011 disclose several examples. However, up to now, a sensor capable of detecting the capacitance variations in three dimensions has not been disclosed yet.

SUMMARY OF THE INVENTION

An objective of the present invention is to provide a 3-dimentional MEMS sensor capable of detecting capacitance variations in three dimensions.

Another objective of the present invention is to provide a mass for MEMS sensor.

To achieve the foregoing objectives, in one perspective of the present invention, it provides a 3-dimensional MEMS sensor, comprising: a first axis fixed electrode; a second axis fixed electrode; a third axis fixed electrode; a movable electrode frame including a first axis movable electrode, a second axis movable electrode, a third axis movable electrode, and a connection part connecting the movable electrodes, wherein the first axis movable electrode and the first axis fixed electrode form a first capacitor along the first axis, the second axis movable electrode and the second axis fixed electrode form a second capacitor along the second axis, and the third axis movable electrode and the third axis fixed electrode form a third capacitor along the third axis, the connection part including a center mass, wherein the center mass is connected with at least one of the first, second and third axis movable electrodes, and has an outer periphery and a first interconnecting segment connecting at least two adjacent sides of the outer periphery; at least one spring connecting with the movable electrode frame; and at least one anchor connecting with the spring, wherein the first, second and third axes are not parallel to one another such that they define a 3-dimensional coordinate system.

In the foregoing 3-dimensional MEMS sensor, the movable electrode frame can be a symmetrical or asymmetrical structure.

In the foregoing 3-dimensional MEMS sensor, the connection part preferably include a center mass, wherein the first axis movable electrode and the second axis movable electrode can be located at locations extending from four sides or four corners of the center mass and connected with the center mass; the third axis movable electrode can also be located at locations extending from four sides or four corners of the center mass and connected with the center mass directly or via an extended connection body. The center mass can have one or a plurality of openings.

In the foregoing 3-dimensional MEMS sensor, the connection part may include at least one periphery mass connecting with the first axis movable electrode, the second axis movable electrode, or both. The periphery mass can have one or a plurality of openings.

In the foregoing 3-dimensional MEMS sensor, the first axis fixed electrode, the second axis fixed electrode, or both, may have a fixing stud which is located closer to the center of the movable electrode frame than to the periphery of the movable electrode frame.

In another perspective of the present invention, it provides a mass for a MEMS sensor, the MEMS sensor including a fixed electrode and a movable electrode, wherein the movable electrode is movable relatively to the fixed electrode, the mass being connected with the movable electrode and comprising: an outer periphery, and a first interconnecting segment connecting at least two adjacent sides of the outer periphery.

The foregoing mass may further comprise: a second interconnecting segment connecting to the first interconnecting segment.

The foregoing MEMS sensor can be a single-axis sensor, a dual-axis sensor, or a tri-axis sensor.

The objectives, technical details, features, and effects of the present invention will be better understood with regard to the detailed description of the embodiments below, with reference to the drawings.

BRIEF DESCRIPTION OF THE DRAWINGS

FIGS. 1A-1B show an embodiment of the present invention.

FIGS. 2A-2B illustrate how to detect a displacement.

FIGS. 7A-7D show several examples of the center mass 141.

FIGS. 8A-8B show, by cross-sectional view, several examples of the periphery mass 142.

DESCRIPTION OF THE PREFERRED EMBODIMENTS

The drawings as referred to throughout the description of the present invention are for illustration only, to show the interrelationships between the process steps and between the layers, but not drawn according to actual scale.

Figure 1A:
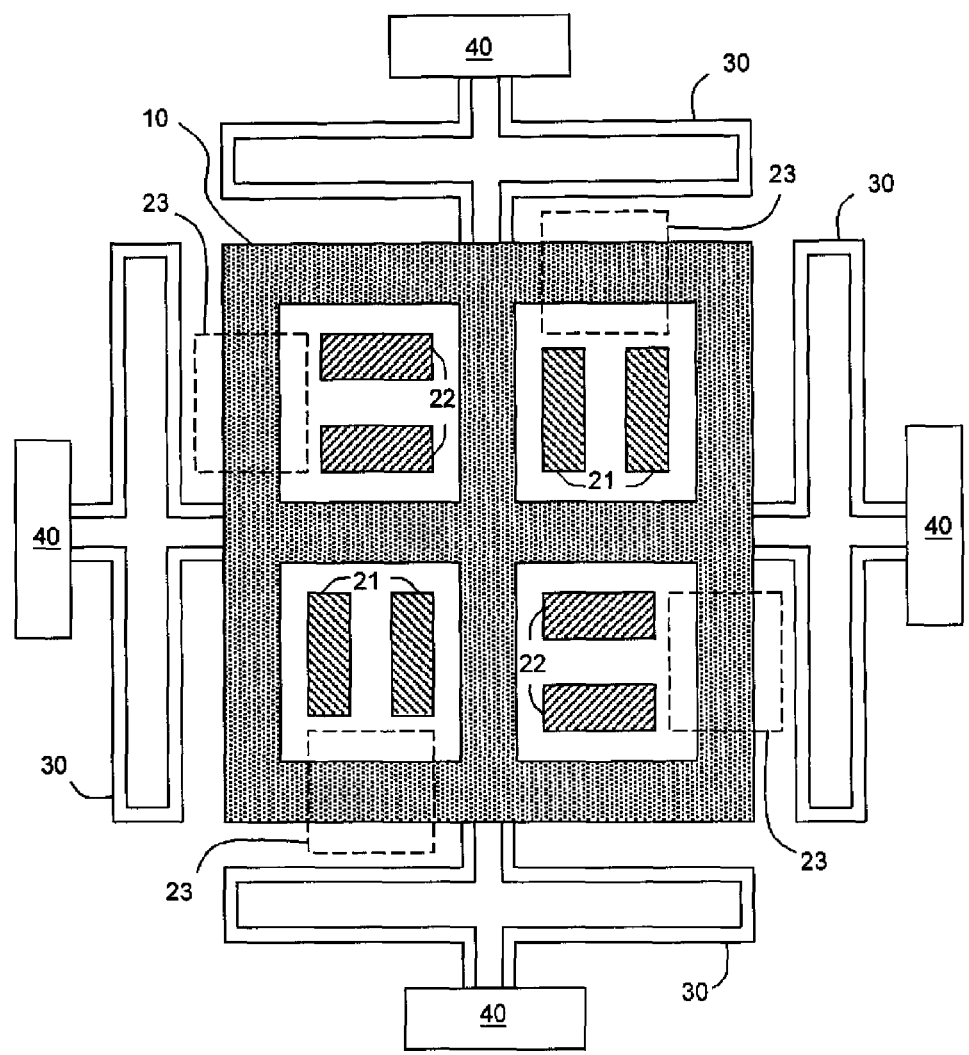

FIG. 1A shows a top view of an embodiment of the present invention. A 3-dimentional MEMS sensor of the present invention comprises a movable electrode frame 10, an x-axis fixed electrode 21, a y-axis fixed electrode 22, a z-axis fixed electrode 23, a spring 30, and an anchor 40. The z-axis fixed electrode 23 and the movable electrode frame 10 are located in different planes, and therefore they are indicated by dashed lines. The anchor 40 and the fixed electrodes 21-23 are fastened on a substrate (not shown), while the movable electrode frame 10 connected to the anchor 40 via the spring 30 is suspended.

FIG. 1B shows the same top view but a closer analysis of the structure of the movable electrode frame 10. The movable electrode frame 10 can be regarded as a tri-axis movable electrode including an x-axis movable electrode 11, a y-axis movable electrode 12, a z-axis movable electrode 13, and a connection part 14 connecting the foregoing three axis movable electrodes together. The x-axis movable electrode 11 is in parallel with the x-axis fixed electrode 21 along the x-axis, the y-axis movable electrode 12 is in parallel with the y-axis fixed electrode 22 along the y-axis, and the z-axis movable electrode 13 is in parallel with the z-axis fixed electrode 23 along the z-axis. As such, three capacitors are formed along the x-axis, y-axis, and z-axis respectively. When the 3-dimentional MEMS sensor is moved, the movable electrode frame 10 moves relatively to the fixed electrodes 21-23 (one or more of the three fixed electrodes). Accordingly, a 3-dimentional displacement of the MEMS sensor can be detected in accordance with capacitance variation thereof.

FIG. 2A is a cross-section view of FIG. 1B along the cross-section line A. The upper part of the FIG. 2A shows that the original distance between the x-axis movable electrode 11 and the x-axis fixed electrode 21 is d; yet, when the 3-dimentional MEMS sensor is moved in a way that the x-axis movable electrode 11 moves rightward as shown in the lower part of FIG. 2A, the distance at the left side is changed to d1 and the distance at the right side is changed to d2. The changes of the distances cause corresponding capacitance variations, such that a displacement along the x-axis can be detected. Likely, a displacement along the y-axis can be detected in a similar way.

The detection along the z-axis is shown in FIG. 2B, which is a cross-section view of the FIG. 1B along the cross-section line B. As shown in the drawing, the original distance between the z-axis movable electrode 13 and the z-axis fixed movable electrode 23 is d. Similarly, when the 3-dimentional MEMS sensor is moved in a way that the z-axis movable electrode 13 moves upward or downward, the distance will be changed, causing corresponding capacitance variations. Thus, a displacement along the z-axis can be detected.

Figure 3A:
FIGS. 3A-3G illustrate, by cross-sectional view, several examples of the fixed electrode.
Figure 3B:
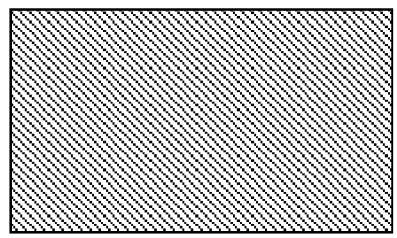
Figure 3E:
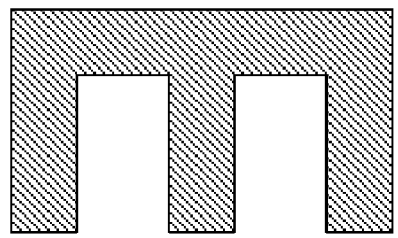
Figure 3C:
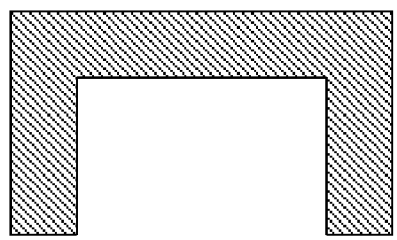
Figure 3F:
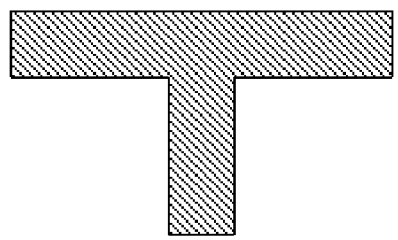
Figure 3D:
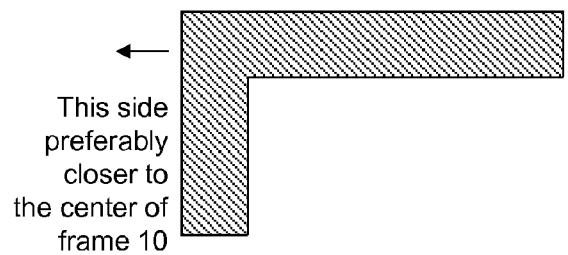
Figure 3G:
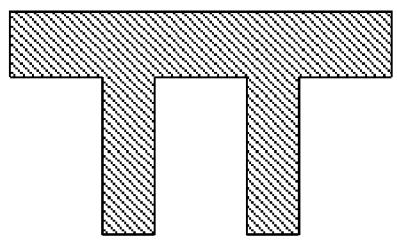

The x-and y-axis fixed electrodes can be any structures in cross-section, as long as they can be fixed on the substrate. For example, when their top views are as shown in FIG. 3A, their cross-sections can be structures shown in FIGS. 3A-3G or any other structures not shown; likewise for the z-axis fixed electrode 23. However, if the fixed electrodes 21-23 has a structure similar to that shown in FIG. 3D (with a fixing stud at only one side), the fixing stud should preferably be located closer to the center of the movable electrode frame 10 than to its periphery.

Figure 4:
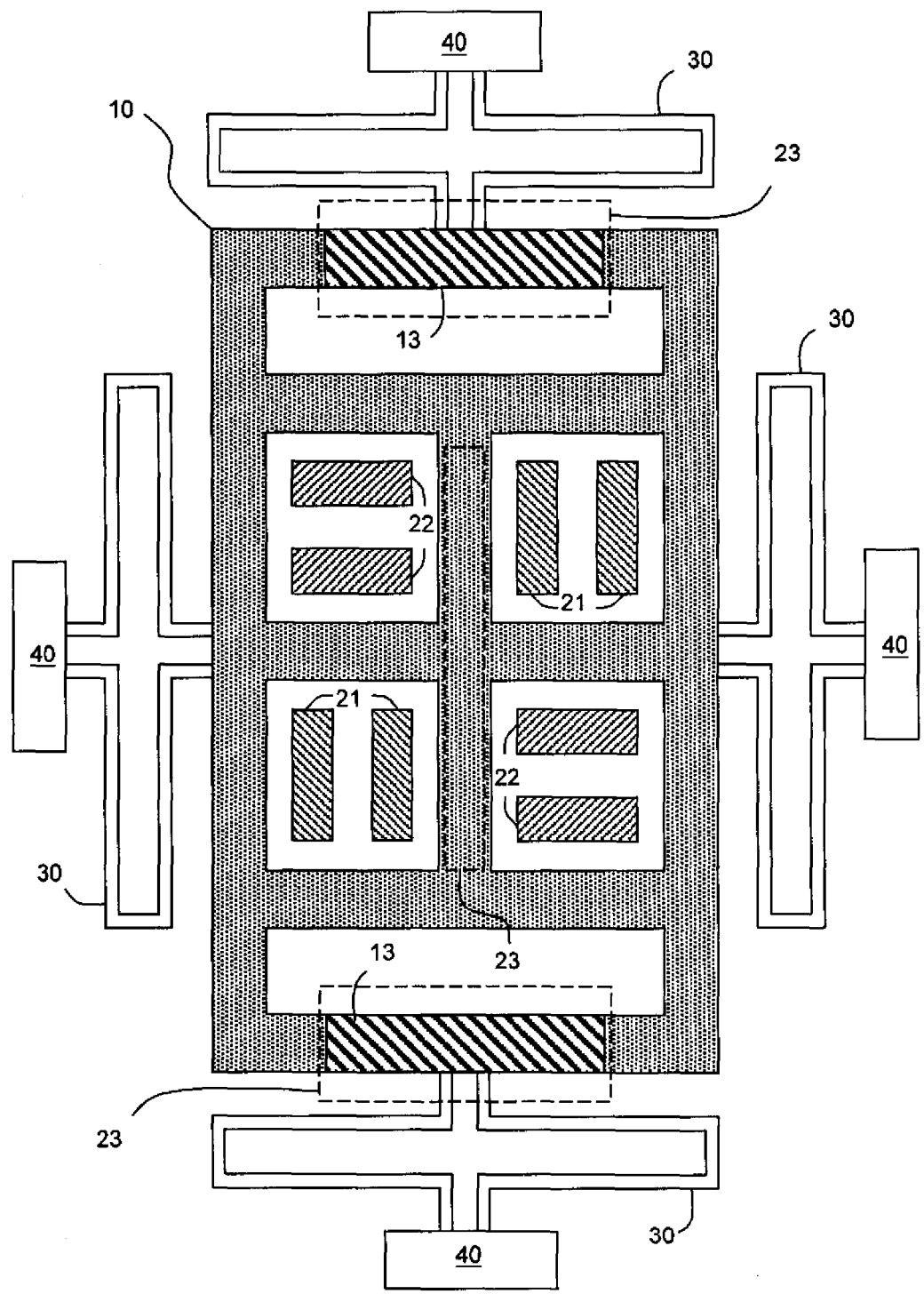
FIG. 4 shows another embodiment of the present invention.

The above is only one possible embodiment of the present invention, and the structures and arrangement of the three axis movable electrodes 11-13, the three axis fixed electrodes 21-23, or the interaction between them, can be modified in various ways. For example, although the movable electrode frame 10 is preferably a symmetrical structure, it is not necessary to be symmetrical. The z-axis movable electrode 13 is not required to be placed at an outer periphery of the movable electrode frame 10, either. FIG. 4 is a top view showing another embodiment of the present invention, wherein the z-axis movable electrode 13 and the z-axis fixed electrode 23 are located in only one direction of the x-y plane (which can be placed at the upper and lower sides as shown in the drawing, or left and right sides not shown). In addition, the z-axis movable electrode 13 is located at the periphery and the center of the movable electrode frame 10 (in order to show the z-axis fixed electrode 23 below the center of the movable electrode frame 10, the z-axis movable electrode 13 located at the center is not marked). Certainly, the movable electrode frame 10 can be even more asymmetrical, such as a structure consisting of only an upper, lower, left, or right portion of this embodiment.

Figure 5:
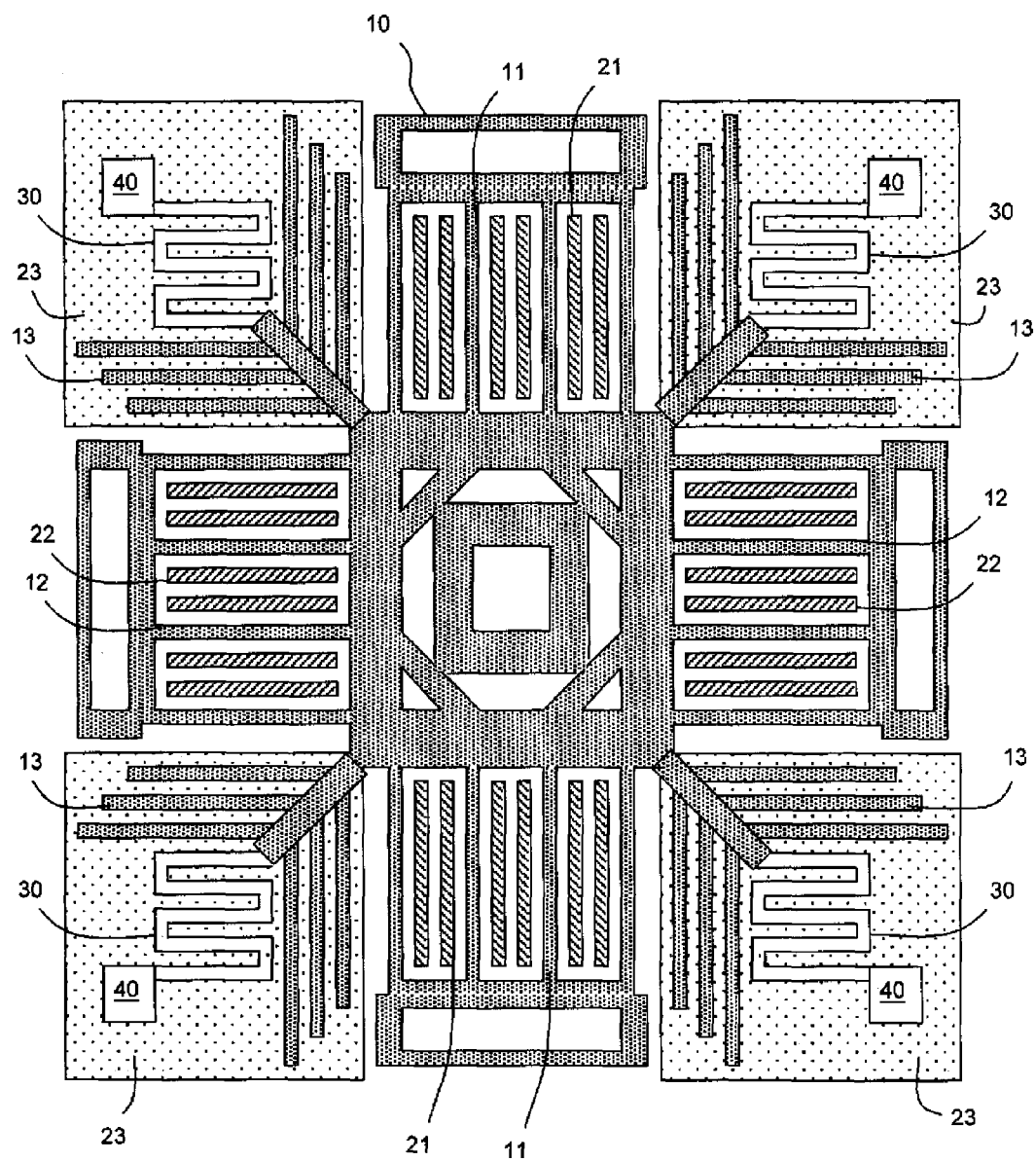
FIGS. 5-6 show yet another embodiment of the present invention.

In the foregoing embodiments, part or all of the three axis movable electrodes 11-13 and the three axis fixed electrodes 21-23 are placed in the center region of the movable electrode frame 10. FIG. 5 shows a top view of yet another embodiment of the present invention, wherein the three axis movable electrodes 11-13 and the three axis fixed electrodes 21-23 are located in the periphery of the movable electrode frame 10, not in the center thereof. As shown in the drawing, the 3-dimentional MEMS sensor of this embodiment also comprises a movable electrode frame 10, x-axis fixed electrode 21, y-axis fixed electrode 22, z-axis fixed electrode 23, spring 30, and an anchor 40. Similarly, when the 3-dimentional MEMS sensor is moved, the movable electrode frame 10 moves relatively to the fixed electrodes 21-23 (one or more thereof). The displacement of the 3-dimentional MEMS sensor can be detected according to the capacitance variations caused thereby. The z-axis fixed electrode 23 is in a plane different from that of the movable electrode frame 10. However, if the structures of the x-axis fixed electrode 21 and the y-axis fixed electrode 22 are similar to that shown in FIG. 3D (with fixing stud at only one side), the fixing stud should preferably be located closer to the center of the movable electrode frame 10 than to the periphery of the movable electrode frame 10.

Figure 6:
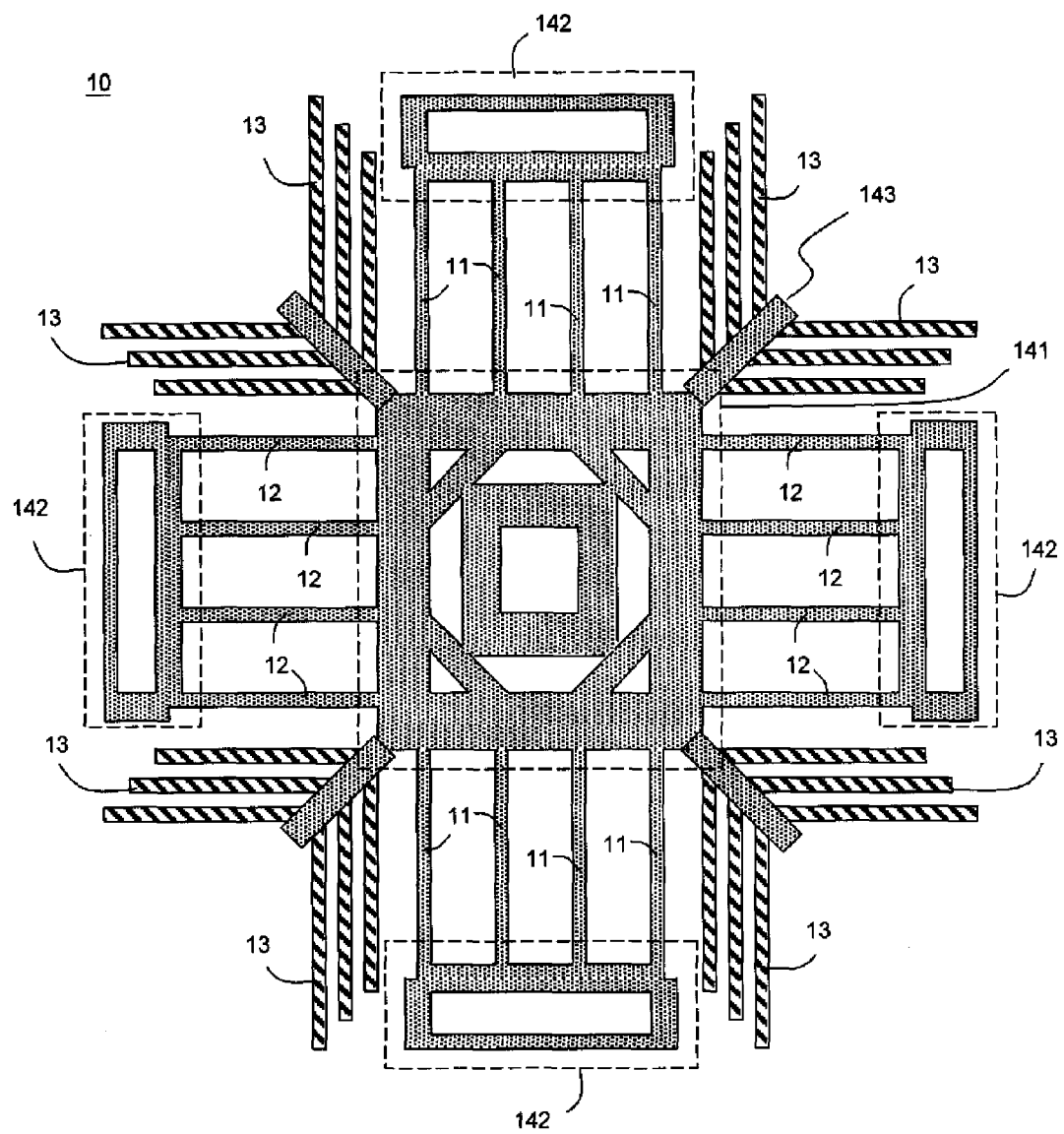

FIG. 6 is a top view for a closer analysis of the structure of the movable electrode frame 10 in this embodiment. This movable electrode frame 10 can be regarded as a tri-axis movable electrode frame including an x-axis movable electrode 11, a y-axis movable electrode 12, a z-axis movable electrode 13, and a connection part connecting the foregoing three axis movable electrodes together. In this embodiment, the connection part includes a center mass 141, a periphery mass 142, and an extended connection body 143. The x-axis movable electrode 11 and the y-axis movable electrode 12 are located at locations extending from four sides of the center mass 141, and the z-axis movable electrode 13 is located at locations extending from four sides of the center mass 141. (The four sides of the center mass 141 mean the upper, lower, left, and right sides of that in the drawing. The four corners of the center mass 141 mean the upper-left, upper-right, lower-left, and lower-right thereof in the drawing. The terms referred to as "four sides" and "four corners" are used for describing the directions, not to limit the scope of the invention that the center mass 141 has to be quadrilateral. For example, the center mass 141 can be a circle, hexagon, octagon, or any other shape.) The center mass 141 provides a connection function as well as a weight function, such that the movable electrode frame 10 is less easily warped due to stress in a fabrication process. Similarly, the periphery mass 192 connecting to the x-axis movable electrode 11 or the y-axis movable electrode 12 provides a weight function as well, such that the x-axis movable electrode 11 and the y-axis movable electrode 12 are less likely warped, particularly the side away from the center mass 141. The extended connection body 143 is for connecting the z-axis movable electrode 13; the extended connection body 143 can also be taken as a portion of the z-axis movable electrode 13, if (but not necessarily) the extended connection body 143 and the fixed electrode 23 form a capacitor.

Preferably, the center mass 141 and the periphery mass 142 have openings. As one function, these openings are provided to facilitate the manufacturing process so that a material layer below the mass can be etched more easily. The openings can also provides the function to reduce a consecutive length of the mass, to avoid warpage.

FIG. 7 is a top view for a closer analysis of the structure of the center mass 141. This center mass 141 can be regarded as a combination including an outer periphery 141a, a first interconnecting segment 141b connecting at least two adjacent sides of the outer periphery 141a, and a second interconnecting segment 141c connecting to the first interconnecting segment 141b. An advantage of the foregoing structure is that it can fully transmit vibrations in any portion of the movable electrode 10. However, the structure of the center mass 141 is not limited to the one shown in FIG. 7A; it can be any structures, such as a structure shown in FIGS. 7B-7D. In FIG. 7B, the center mass 141 includes the outer periphery 141a and only the first interconnecting segment 141b connecting at least two adjacent sides of the outer periphery 141a. In FIG. 7C, the center mass 141 includes the outer periphery 141a and only the interconnecting segment 141d connecting at least two opposite sides of the outer periphery 141a. In FIG. 7D, the center mass 141 is not a structure including "an outer periphery and an interconnecting segment". It includes a plurality of the openings within it wherein the openings 141e and 141f are not totally in alignment (but certainly can also be in alignment). The purpose to arrange the openings so that they are not in alignment is to reduce the physical length of the center mass 141 in a direction; for example, in FIG. 7D, the length of the center mass 141 is not longer than a predetermined value in y-direction (except the outer periphery 141a).

The center mass 141 described above is not limited to be used in the tri-axis MEMS sensor; it can also be applied to single axis or dual-axis MEMS sensor. For example, in the embodiments shown in FIGS. 5 and 6, if the movable electrode frame 10 does not include one of the x-axis movable electrode 11, the y-axis movable electrode 12, and the z-axis movable electrode 13 (the corresponding fixed electrode can also be omitted), the entire structure becomes a dual-axis MEMS sensor. Similarly, if the movable electrode frame 10 does not include two of the x-axis movable electrode 11, the y-axis movable electrode 12, and the z-axis movable electrode 13 (the corresponding fixed electrodes can also be omitted), the entire structure becoms a single axis MEMS sensor.

Likewise, the periphery mass 142 can be any structure other than the structure shown in FIG. 8A, that is, not necessarily a structure which includes an outer periphery 142a and an opening 142b. For example, it can be the structure shown in FIG. 8B, or any other shape combined with any form of openings. In FIG. 8B, other than shifting the openings 142c and the openings 142d so that they are not in alignment, openings 142e are further provided around the periphery, such that the length of the periphery mass 142 is not longer than a predetermined threshold vale in one direction (e.g., the x-direction as shown in the drawing). This reduced the consecutive length of the mass to avoid warpage.

Figure 6A:
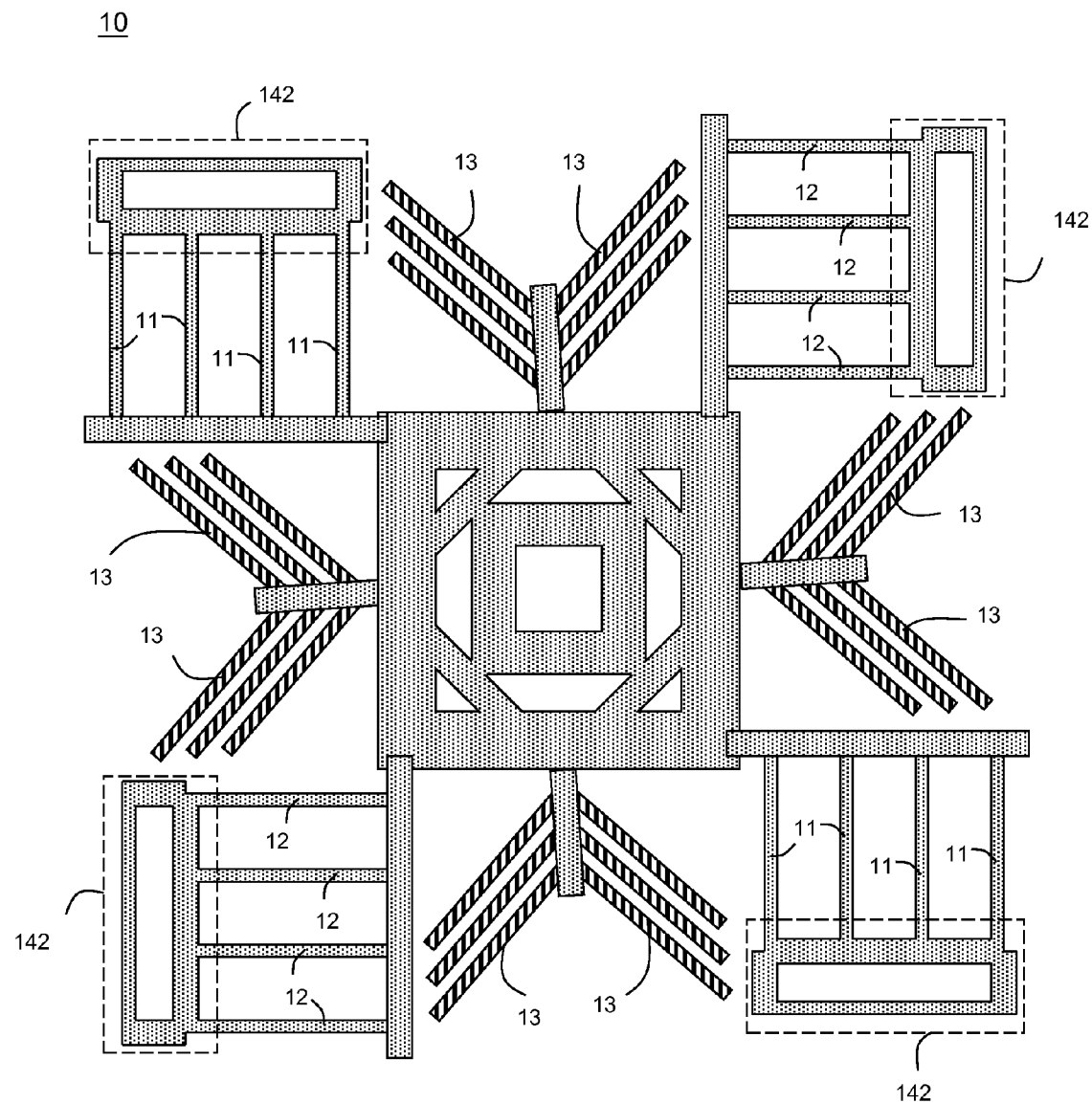
FIG. 6A shows a variation of FIG. 6.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, in the embodiment shown in FIG. 6, the x-axis movable electrode 11 and the y-axis movable electrode 12 can be located at locations extending from four corners of the center mass 141, and the z-axis movable electrode 13 can be located at locations extending from four sides of the center mass 141, as shown in FIG. 6A (the fixed electrodes 21-23 are arranged accordingly). In the embodiments shown in FIGS. 1A and 4, the spring 30 and the anchor 40 can be located at locations extending from four corners of the movable electrode frame 10. In the embodiment shown in FIG. 6, the spring 30 and the anchor 40 can be located at locations extending from four sides of the movable electrode frame 10, or the like. In addition, although the present invention uses a coordinate system having x-axis, y-axis, and z-axis perpendicular to one another as an example, it is not limited to this system. The three dimensional displacement of the 3-dimentional MEMS sensor can be calculated in any 3-dimensional system with any three axes not parallel to one another. In view of the foregoing, the spirit of the present invention should cover all such and other modifications and variations, which should be interpreted to fall within the scope of the following claims and their equivalents.

What is claimed is:

1. A 3-dimensional MEMS sensor, comprising:
a first axis fixed electrode;
a second axis fixed electrode;
a third axis fixed electrode;
a movable electrode frame including a first axis movable electrode, a second axis movable electrode, a third axis movable electrode, and a connection part connecting the movable electrodes, wherein the first axis movable electrode and the first axis fixed electrode form a first capacitor along the first axis, the second axis movable electrode and the second axis fixed electrode form a second capacitor along the second axis, and the third axis movable electrode and the third axis fixed electrode form a third capacitor along the third axis, the connection part including a center mass, wherein the center mass is connected with at least one of the first, second and third axis movable electrodes, and has an outer periphery and a first interconnecting segment directly and straightly connecting at least two adjacent sides of the outer periphery;
at least one spring connecting with the movable electrode frame; and
at least one anchor connecting with the spring,
wherein the first, second and third axes are not parallel to one another such that they define a 3-dimensional coordinate system.

2. The 3-dimensional MEMS sensor of claim 1, wherein the third axis fixed electrode and the movable electrode frame are in different planes.

3. The 3-dimensional MEMS sensor of claim 1, wherein the first axis is x-axis, the second axis is y-axis, and the third axis is z-axis, wherein the three axes are perpendicular to one another, and the movable electrode frame is symmetrical along the x-axis, y-axis, or both x-and y-axes.

4. The 3-dimensional MEMS sensor of claim 1, wherein the connection part further includes at least one extended connection body by which the center mass is connected with at least one of the first, second, and third axis movable electrodes.

5. The 3-dimensional MEMS sensor of claim 1, wherein the first axis movable electrode and the second axis movable electrode include parts which are located at locations extending from four sides of the center mass.

6. The 3-dimensional MEMS sensor of claim 1, wherein the first axis movable electrode and the second axis movable electrode include parts which are located at locations extending from four corners of the center mass.

7. The 3-dimensional MEMS sensor of claim 1, wherein the third axis movable electrode includes parts which are located at locations extending from four sides of the center mass.

8. The 3-dimensional MEMS sensor of claim 1, wherein the center mass further includes a second interconnecting segment connecting to the first interconnecting segment.

9. The 3-dimensional MEMS sensor of claim 1, wherein the center mass further includes a second interconnecting segment connecting at least two opposite sides of the outer periphery.

10. The 3-dimensional MEMS sensor of claim 1, wherein the connection part further includes at least one periphery mass connecting with the first axis movable electrode, the second axis movable electrode, or both.

11. The 3-dimensional MEMS sensor of claim 10, wherein the periphery mass has an opening.

12. The 3-dimensional MEMS sensor of claim 10, wherein the periphery mass has a plurality of openings not totally in alignment.

13. The 3-dimensional MEMS sensor of claim 1, wherein the first axis fixed electrode, the second axis fixed electrode, or both, have a fixing stud which is located closer to the center of the movable electrode frame than to the periphery of the movable electrode frame.

14. A mass for a MEMS sensor, the MEMS sensor including a fixed electrode and a movable electrode, wherein the movable electrode is movable relatively to the fixed electrode, the mass being connected with the movable electrode and comprising: an outer periphery, and a first interconnecting segment directly and straightly connecting at least two adjacent sides of the outer periphery.

15. The mass of claim 14, further comprising a second interconnecting segment connecting to the first interconnecting segment.

16. The mass of claim 14, further comprising a second interconnecting segment connecting at least two opposite sides of the outer periphery.

17. The mass of claim 14, wherein the MEMS sensor is a single axis sensor and the movable electrode is movable relatively to the fixed electrode in one dimension.

18. The mass of claim 14, wherein the MEMS sensor is a dual-axis sensor, and wherein the movable electrode includes a first axis movable electrode and a second axis movable electrode, and the fixed axis electrode includes a first axis fixed electrode and a second axis fixed electrode; the first axis movable electrode being movable relatively to the first axis fixed electrode along the first axis, and the second axis movable electrode being movable relatively to the second axis fixed electrode along the second axis, wherein the first and second axes are not parallel to each other.

19. The mass of claim 14, wherein the MEMS sensor is a tri-axis sensor, and wherein the movable electrode includes a first axis movable electrode, a second axis movable electrode, and a third axis movable electrode, and the fixed axis electrode includes a first axis fixed electrode, a second axis fixed electrode, and a third axis fixed electrode; the first axis movable electrode being movable relatively to the first axis fixed electrode along the first axis, the second axis movable electrode being movable relatively to the second axis fixed electrode along the second axis, and the third axis movable electrode being movable relatively to the third axis fixed electrode along the third axis, wherein the first, second and third axes are not parallel to one another.

20. A 3-dimensional MEMS sensor, comprising:
a first axis fixed electrode;
a second axis fixed electrode;
a third axis fixed electrode;
a movable electrode frame including a first axis movable electrode, a second axis movable electrode, a third axis movable electrode, and a connection part connecting the movable electrodes, wherein the first axis movable electrode and the first axis fixed electrode form a first capacitor along the first axis, the second axis movable electrode and the second axis fixed electrode form a second capacitor along the second axis, and the third axis movable electrode and the third axis fixed electrode form a third capacitor along the third axis, the connection part including a center mass, wherein the center mass is connected with at least one of the first, second and third axis movable electrodes, and has an outer periphery and a first interconnecting segment connecting at least two adjacent sides of the outer periphery;
at least one spring connecting with the movable electrode frame; and
at least one anchor connecting with the spring,
wherein the first, second and third axes are not parallel to one another such that they define a 3-dimensional coordinate system, and wherein the third axis movable electrode includes parts which are located at locations extending from four corners of the center mass.

* * * * *